United States Patent Office 3,161,669
Patented Dec. 15, 1964

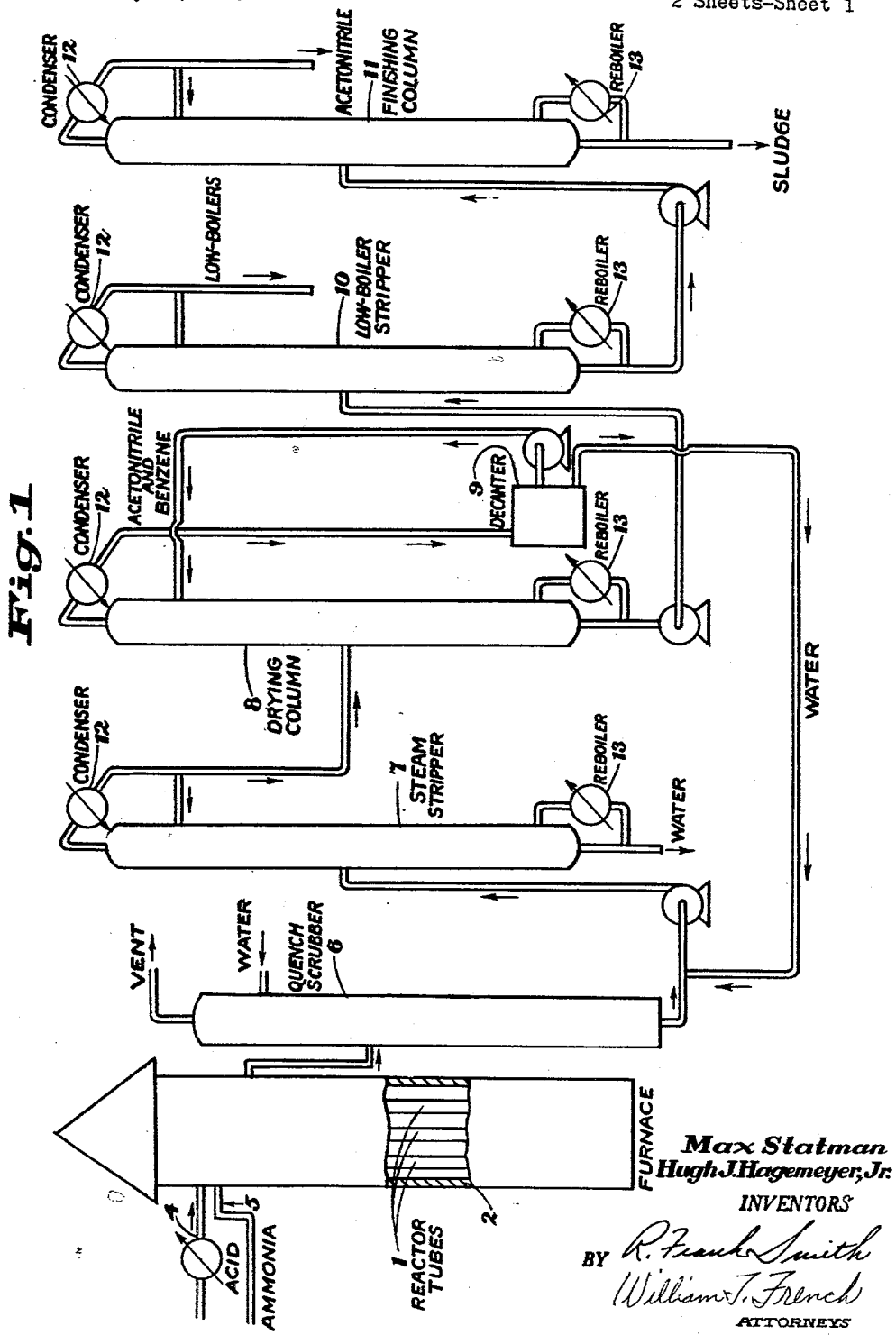

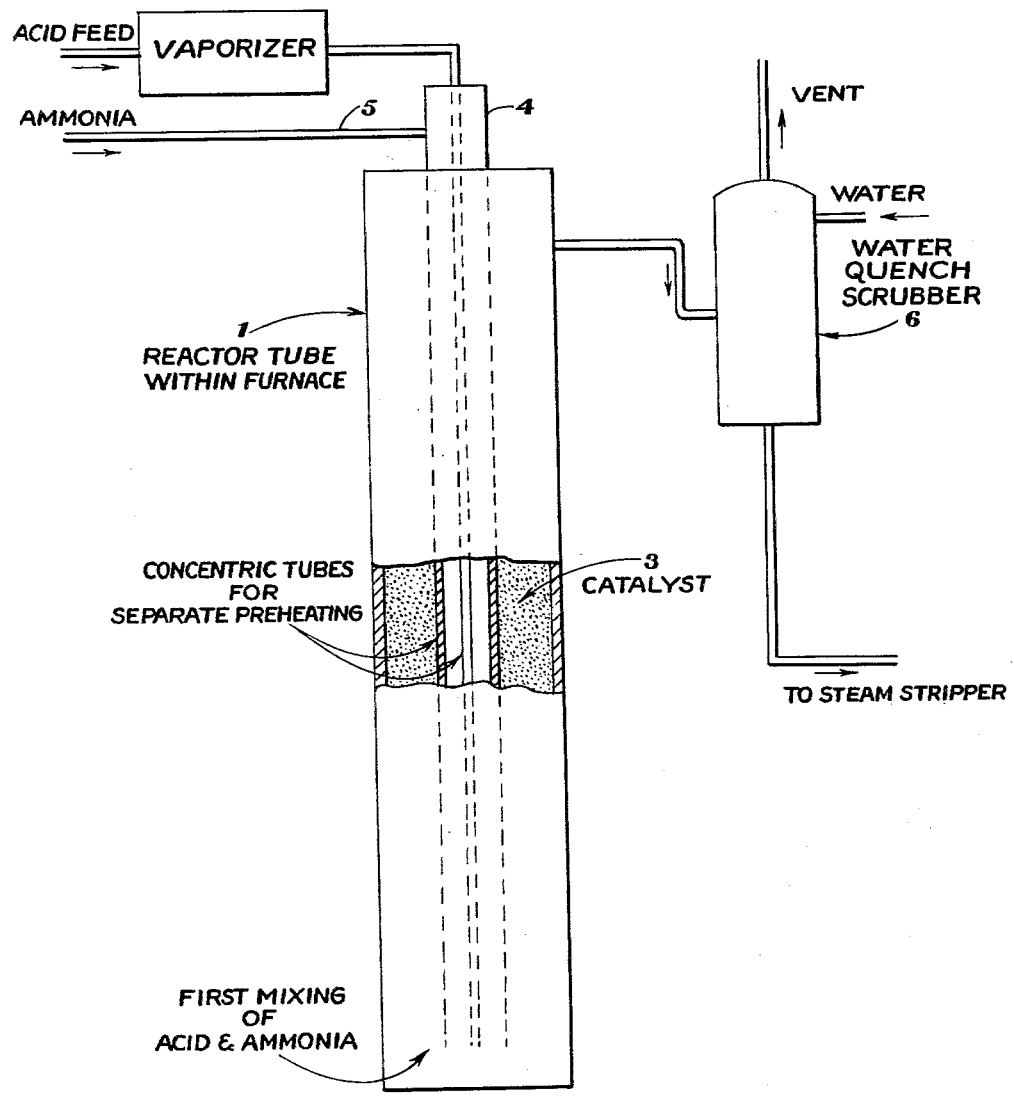

3,161,669
ACETONITRILE PROCESS
Max Statman and Hugh J. Hagemeyer, Jr., both of Longview, Tex., assignors to Eastman Kodak Company, Rochester, N.Y., a corporation of New Jersey
Filed July 10, 1961, Ser. No. 122,851
4 Claims. (Cl. 260—465.2)

This invention relates to manufacture of lower aliphatic nitriles, particularly to manufacture of acetonitrile by reaction of ammonia with acetic acid or acetic anhydride.

An object of the invention is to provide a process for synthesis of an acetonitrile product substantially free of ketone by-products. A further object is to provide a process combining such synthesis with further purification of the ketone-free acetonitrile product. A further object is to produce high yields of acetonitrile, substantially free of ketone by-products, by reaction of acetic acid or acetic anhydride with ammonia in the presence of a selected catalyst.

It is already known that acetonitrile may be obtained by contacting vapors of acetic acid and ammonia in the presence of alumina catalyst at elevated temperatures. A disadvantage with alumina catalyst is that considerable ketone by-product, principally acetone, is produced which is undesirable for a number of reasons.

We have found that by using catalyst consisting essentially of phosphoric acid impregnated on alumina pellets, we can produce extremely high yields of acetonitrile with practically no acetone or other ketone by-product. Furthermore, the phosphoric acid is not leached from the alumina, and effective catalyst life of more than 1000 hours can be attained when using high crush-strength alumina pellets impregnated with phosphoric acid. In this respect, the phosphoric acid alumina catalyst used in our process is markedly superior to catalysts consisting of phosphoric acid on supports such as silica, etc.

Considerable technical advantage is gained by using a catalyst for the reaction which inhibits production of acetone or other ketone by-products. Absence of ketones permits a much simpler process for purifying the acetonitrile product because, of course, separation of ketones is avoided, but more importantly, azeotropic distillation may be used successfully for drying the acetonitrile product. Lower aliphatic ketones, especially acetone, when present, make it difficult or impossible to achieve good separation of the nitrile product from water by the known azeotropic distillation processes.

According to the invention, ammonia and acetic acid or acetic anhydride are reacted at elevated temperatures in the presence of pelleted alumina impregnated with phosphoric acid and the ketone-free reaction product is purified by a distillation process comprising an azeotropic distillation step for separating water from the acetonitrile. Superior yields of acetonitrile are obtained and purification is made easier by using this particular catalyst.

In a preferred embodiment of the invention, high crush-strength alumina pellets impregnated with phosphoric acid are used to achieve greatly extended catalyst life.

In a preferred embodiment of the invention, acetic anhydride rather than acetic acid is reacted with ammonia. Somewhat better yields are obtained, the reaction temperature is lower, and less water is formed by the reaction so that less heating and cooling apparatus is required.

Other advantages will appear from the following detailed description considered with reference to the attached drawings.

In the drawings:

FIG. 1 is a flow diagram illustrating a preferred embodiment of the invention.

FIG. 2 is a detailed diagram illustrating a preferred embodiment of a reactor tube in the furnace of FIG. 1.

Referring to FIG. 1, acetic acid (or acetic anhydride) and ammonia are fed in vapor state into reactor tubes 1 in a furnace 2 where reaction temperature is maintained. As shown in FIG. 2 the reactor tube 1 is packed with catalyst 3; the pre-vaporized acetic acid (or acetic anhydride) and ammonia are fed through separate concentric tubes 4 and 5 which lead into the bottom of the reactor tube 1. Thus the reactants are kept apart until they are in the presence of the catalyst. As the reactants travel upwards through the catalyst 3 packed in the reactor tube 1, the reaction proceeds as follows:

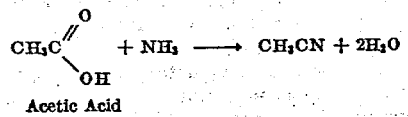

Acetic Acid or

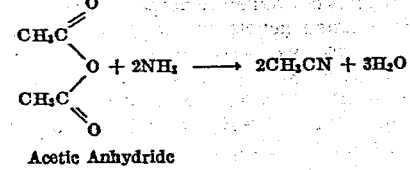

Acetic Anhydride

The temperature in the reactor tube 1 is maintained at reaction temperature by heat of the furnace 2. If acetic acid is used, a selected reaction temperature from 450° to 700° C. is maintained, and if acetic anhydride is used, a selected reaction temperature from 375° to 700° C. is maintained. Good yields are obtained at the lower permissible temperatures which are preferred for economic reasons. Contact time for the reaction may vary from 1.5–16 seconds. Ammonia to acetic anhydride ratio may vary between 1.5:1 and 4:1. Ammonia to acetic acid ratio may vary between 1:1 and 1.35:1. Good results are obtained when the reaction is conducted at atmospheric pressure.

Principal reaction products are acetonitrile and water; practically no acetone or other ketones are formed. The product gases are led from the reaction tubes 1 in the furnace 2 to a water quench scrubber 6 where the product gases are intimately contacted with water to condense the acetonitrile and water products which are then removed with the quench water from the bottom of the scrubber 6, thence led to a steam stripper column 7 (FIG. 1). In the steam stripper column 7 overhead temperature is maintained at 76–80° C. so that the overhead vapor is essentially the acetonitrile-water azeotrope containing 14–18 percent water. With adequate fractionation, bottoms from the steam stripper 7 will consist essentially of water with practically no acetonitrile. The water-acetonitrile azeotrope is condensed and then is led to a drying column 8 where the azeotrope components are separated by azeotropic distillation using benzene, toluene, or other suitable separating agent.

At this point in the process absence of ketones from the reaction product becomes particularly important, for any ketones present would seriously interfere with the efficiency of the azeotropic distillation whereby water and acetonitrile are separated.

A suitable process for azeotropic distillation of the acetonitrile-water azeotrope is described in detail in U.S. Patent No. 2,305,106. Dry acetonitrile is removed as liquid from the bottom of the drying column 8. Overhead vapors consisting essentially of a ternary azeotrope of water, acetonitrile and a separating agent, preferably benzene, are condensed and the condensate is led to a decanter 9 where it separates into organic and water phases. The organic layer consisting of acetonitrile and benzene is decanted and refluxed to the drying column 8 and the water is returned to the steam stripper feed. When a ketone, particularly acetone, is present some of it will distill over with the overhead vapors from the drying column 8 with the result that the condensate will not separate effectively into immiscible organic and water phases at the decanter 9. Consequently, the efficiency of the drying column is seriously impaired.

We prefer to further purify the acetonitrile by further distillation. From the drying column 8 the bottoms containing acetonitrile are led to a low-boiler stripper column 10 in which low-boiling point impurities are removed overhead. Bottoms from the low-boiler stripper 10 containing essentially all of the acetonitrile product are led to a finishing column 11 from which purified acetonitrile is removed overhead and high-boiling impurities are removed as bottoms. The finished acetonitrile product contains less than 0.1 percent impurities.

Overhead vapors from each fractionating column 7, 8, 10 and 11, are condensed in conventional condensers 12. Bottoms are recirculated as necessary through conventional reboiler equipment 13.

The selected catalyst is conveniently prepared by evacuating the catalytic alumina pellets and then soaking the evacuated pellets with an aqueous solution having a concentration, e.g. of 10 to 90 weight percent and preferably 15 to 30 weight percent phosphoric acid. The alumina pellets after soaking with the phosphoric acid solution for a period of, for example, a few minutes to an hour or more, are then drained of excess phosphoric acid solution and can be placed in the reactor tubes without further drying or other treatment. The finished phosphoric acid-alumina catalyst will contain, for example, about 3 to 75 percent by weight and preferably 5 to 30 weight percent phosphoric acid. The preferred catalyst for our process is prepared from high crush-strength alumina pellets. Such pellets should have a crush-strength of at least about 20 pounds of force as measured by a Stokes Hardness Tester, U.S. Patent No. 2,041,869. Pellets having a crush-strength in the range of about 20 to 40 pounds are preferred. An example of such a high crush-strength pelleted alumina catalyst is the product of Harshaw Chemical Co. known as Harshaw Alumina 0104 pellets. Extruded pellets of from about ⅛ to ¼-inch in length and diameter are quite satisfactory although pellets of somewhat smaller or larger size can be used and the shape of the pellets is not critical.

Although we do not wish to be bound by theoretical explanations, there appears to be a chemical bond between the alumina and phosphoric acid which prevents leaching of the phosphoric acid from the alumina under reactor conditions and tends to improve crush strength of the catalyst. We have found that high crush-strength alumina pellets impregnated with phosphoric acid do not clog or channel within the catalyst tubes as do similarly impregnated alumina particles of low crush-strength and effective catalyst life of more than 1000 hours is obtained using the preferred catalyst.

The following examples illustrate specific embodiments of the invention.

EXAMPLE 1

A reactor was packed with 10 cubic feet of Harshaw Alumina 0104 pellets (¼-inch size) saturated with an aqueous solution of 25 weight percent phosphoric acid. Ammonia and acetic acid were passed at a temperature of 450° C. into the reaction chamber at a mole ratio of ammonia to acetic acid of 1.13:1. Contact time was 4.5 seconds. 5700 pounds of acetic acid and 1820 pounds of ammonia were fed per day. The production of acetonitrile was 3700 pounds per day, or a 95% yield based on acetic acid. Reaction gases leaving the reactor were condensed in a water quench scrubber. From the scrubber 3700 pounds of acetonitrile and 4000 pounds of water were fed to a steam stripper and 3400 pounds of water was removed from the base of the stripper. The overhead drawn from the stripper at 79° C. contained 3700 pounds acetonitrile and 600 pounds water. This overhead material was fed to a drying column where 600 pounds per day of water was removed by azeotropic distillation using benzene as a separating agent. The dry acetonitrile bottoms from the drying column were fed to a distillation column where low boiling point impurities were removed overhead. Acetonitrile bottoms from this column were fed to a final stripping column from which the final purified acetonitrile product was withdrawn overhead. The purified acetonitrile had an ASTM boiling range of 81.3–83.1° C., APHA color of 10, water content of 0.016 weight percent, no trace of carbonyl or benzene and total impurities as measured by chromatographic analysis of less than 0.1 weight percent.

EXAMPLE 2

Using the same type of catalyst as was used in Example 1, ammonia and acetic anhydride were reacted at 400° C. in the reaction chamber. Mole ratio of ammonia to acetic anhydride was 2.2:1 and contact time was 5.7 seconds. 5300 pounds of acetic anhydride and 1950 pounds of ammonia were fed per day. The production rate of acetonitrile was 4000 pounds per day, or a 98% yield based on acetic anhydride. 4000 pounds per day of acetonitrile and 4000 pounds per day of water were fed from the quench scrubber to a steam stripper and 3550 pounds per day of water was removed from the base of the stripper. The overhead from the stripper at 79° C. contained 4000 pounds per day of acetonitrile and 650 pounds per day of water. This material was fed to a drying column which discharged 650 pounds of water per day. Bottoms from the drying column were purified as in Example 1 by two stage fractional distillation. The final acetonitrile product had an ASTM boiling range of 81.3–83.1° C., APHA color of 10, water content of 0.016 weight percent, no trace of carbonyl or benzene, and total impurities as measured by chromatographic analysis of less than 0.1 weight percent.

Following are tables showing results obtained by reacting ammonia with both acetic acid and acetic anhydride to produce acetonitrile by the methods described above, using four different catalysts. The catalysts were low crush-strength alumina pellets (activated alumina, 4–6 mesh impregnated with an aqueous solution of 20 weight percent $H_3PO_4$), impregnated high crush-strength alumina pellets (Harshaw Alumina 0104 pellets with a 20 weight percent solution of $H_3PO_4$), unimpregnated high crush-strength alumina pellets (Harshaw Alumina 0104 containing no $H_3PO_4$), and impregnated high crush-strength pellets of diatomaceous earth (Celite with a 20 weight percent $H_3PO_4$ solution). The results demonstrate the advantages of the catalyst prepared by impregnating high crush-strength alumina pellets with $H_3PO_4$, in terms of higher yield, longer operating life, and inhibition of ketone by-product.

Table I
ACETONITRILE FROM ACETIC ACID AND AMMONIA 1:1.13 AT 450° C.

| Catalyst | Conv., percent | Yield, percent | Ketone, percent | Production Rate Lbs./Cu. Ft./Hr. | Catalyst Life, Hours | Crush Strength, Lbs. of Force | Comment |
|---|---|---|---|---|---|---|---|
| Activated Alumina 4–6 mesh 20% $H_3PO_4$ sol'n. | 93 | 95 | 0.22 | 19 | 12 | 3–6 | Catalyst crumbled, plugged tubes. |
| Harshaw Al 0104 3/32" pellets+20 $H_3PO_4$ sol'n. | 96 | 95 | 0.21 | 23 | >1,000 | 30–40 | |
| Harshaw Al 0104 3/32" pellets | 85 | 75 | 10.1 | 20 | >1,000 | 25–35 | |
| Celite ¼" pellets+20% $H_3PO_4$ sol'n. | 97–70 | 92 | 0.2 | 23–6 | <24 | 20–30 | $H_3PO_4$ leached from supports. Rapid decline in activity. |

Table II
ACETONITRILE FROM ACETIC ANHYDRIDE AND AMMONIA 2.2:1 AT 400° C.

| Catalyst | Conv., percent | Yield, percent | Ketone, percent | Production Rate Lb./Hr./Ft.³ | Catalyst Life, Hours | Crush Strength, Lbs. of Force | Comment |
|---|---|---|---|---|---|---|---|
| Activated Alumina 4–6 mesh 20% $H_3PO_4$ sol'n. | 95 | 96 | 0.22 | 25 | 12 | 3–6 | Catalyst crumbled and plugged tubes. |
| Harshaw Al 0104 ¼-inch pellets+20% $H_3PO_4$ sol'n. | 98 | 98 | 0.21 | 30 | 1,000 | 30–40 | |
| Harshaw Al 0104 | 90 | 79 | 10.21 | 27 | 1,000 | 25–35 | |
| Celite ¼-inch pellets+20% $H_3PO_4$ sol'n. | 95 | 92 | 0.2 | 30 | 24 | 20–30 | $H_3PO_4$ leached from supports. Rapid decline in activity. |

The above examples are given as illustrations of specific embodiments of the invention and should not be construed to limit the scope of the invention as described in the following claims.

We claim:

1. A process for the production of acetonitrile which consists essentially of reacting ammonia and a member selected from the group consisting of acetic acid and acetic anhydride in the vapor phase at an ammonia to acetic anhydride ratio in the range from 1.5:1 to 4:1 when acetic anhydride is selected and an ammonia to acetic acid ratio in the range from 1:1 to 1.35:1 when acetic acid is selected, at a contact time in the range from 1.5 to 16 seconds and at a temperature of from 375° C. to 700° C. in the presence of catalytic alumina pellets impregnated with from 5 to 75% by weight of phosphoric acid and wherein the reactants are separately heated to the desired reaction temperature and then, while in the vapor phase and while in said heated condition, reacted under the reaction conditions set forth hereinbefore.

2. A process for the production of acetonitrile which consists essentially of reacting ammonia and a member selected from the group consisting of acetic acid and acetic anhydride in the vapor phase at an ammonia to acetic anhydride ratio in the range from 1.5:1 to 4:1 when acetic anhydride is selected and an ammonia to acetic acid ratio in the range from 1:1 to 1.35:1 when acetic acid is selected, at a contact time in the range from 1.5 to 16 seconds and at a temperature of from 375° C. to 700° C. in the presence of catalytic alumina pellets impregnated with from 5 to 75% by weight of phosphoric acid and wherein the reactants are separately heated to the desired reaction temperature and then, while in the vapor phase and while in said heated condition, reacted under the reaction conditions set forth hereinbefore, condensing the reaction products, distilling the water-acetonitrile azeotrope from the condensed reaction products, and separating the components of the water-acetonitrile azeotrope by azeotropic distillation.

3. Process according to claim 1 wherein the catalytic alumina pellets are impregnated with from 5 to 30% by weight of phosphoric acid.

4. Process according to claim 2 wherein the catalytic alumina pellets are impregnated with from 5 to 30% by weight of phosphoric acid.

References Cited in the file of this patent

UNITED STATES PATENTS 2,732,397    Hull _____ Jan. 24, 1956

OTHER REFERENCES

Kobayashi et al.: Chemical Abstracts, vol. 27, 1933, page 2671.